(12) United States Patent
Shuster

(10) Patent No.: US 11,658,894 B2
(45) Date of Patent: May 23, 2023

(54) FORUM SEARCH WITH TIME-DEPENDENT ACTIVITY WEIGHTING

(71) Applicant: Gary Stephen Shuster, Vancouver (CA)

(72) Inventor: Gary Stephen Shuster, Vancouver (CA)

(*) Notice: Subject to any disclaimer, the term of this patent is extended or adjusted under 35 U.S.C. 154(b) by 0 days.

(21) Appl. No.: 16/698,782

(22) Filed: Nov. 27, 2019

(65) Prior Publication Data

US 2020/0099607 A1 Mar. 26, 2020

Related U.S. Application Data

(63) Continuation of application No. 15/292,048, filed on Oct. 12, 2016, now abandoned, which is a continuation of application No. 14/680,008, filed on Apr. 6, 2015, now Pat. No. 9,473,377, which is a continuation of application No. 12/479,171, filed on Jun. 5, 2009, now Pat. No. 9,002,820.

(60) Provisional application No. 61/059,210, filed on Jun. 5, 2008.

(51) Int. Cl.
| | |
|---|---|
| *G06F 16/00* | (2019.01) |
| *H04L 43/10* | (2022.01) |
| *G06F 16/951* | (2019.01) |
| *G06F 16/9535* | (2019.01) |
| *G06F 16/9537* | (2019.01) |
| *H04L 67/01* | (2022.01) |
| *H04L 67/50* | (2022.01) |
| *H04L 67/02* | (2022.01) |

(52) U.S. Cl.
CPC ............ *H04L 43/10* (2013.01); *G06F 16/951* (2019.01); *G06F 16/9535* (2019.01); *G06F 16/9537* (2019.01); *H04L 67/01* (2022.05); *H04L 67/02* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 6,854,012 | B1* | 2/2005 | Taylor | H04L 41/22 709/224 |
| 2003/0120823 | A1* | 6/2003 | Kim | H04L 67/38 719/310 |
| 2004/0254809 | A1* | 12/2004 | Teicher | A63F 13/12 705/1.1 |
| 2005/0228866 | A1* | 10/2005 | Endler | G06Q 30/02 709/206 |

(Continued)

*Primary Examiner* — Bai D Vu
(74) *Attorney, Agent, or Firm* — Sherrie Flynn; Aisha Otori; Coleman & Horowitt LLP

(57) ABSTRACT

A search engine index measures and tracks one or more numeric indicators of activity at different times, including a most current time, in on-line forums and social networking sites. Such indicators may include, for example, a current volume per unit time of messages or data posted to the site, a moving average of such volume, a moving average of current participants over time, a count of current participants, other indication of site activity, or any combination of such indicators. The search engine is responsive to queries seeking forums ranked by activity for a defined time period, including a most current time. The search engine prioritizes search results to identify the specified sites or locations in order of activity (among other possible criteria) relative to a defined time.

19 Claims, 3 Drawing Sheets

(56) References Cited

U.S. PATENT DOCUMENTS

| | | | | |
|---|---|---|---|---|
| 2007/0073553 A1* | 3/2007 | Flinn | ............... | G06Q 30/0283 |
| | | | | 705/1.1 |
| 2007/0162547 A1* | 7/2007 | Ross | ............... | G06Q 10/10 |
| | | | | 709/204 |
| 2008/0184326 A1* | 7/2008 | Nakajima | ............ | H04N 21/252 |
| | | | | 725/133 |
| 2009/0043646 A1* | 2/2009 | Pingali | ............... | G06F 11/3409 |
| | | | | 705/7.27 |
| 2009/0235350 A1* | 9/2009 | Garbow | ............ | H04L 63/1441 |
| | | | | 726/15 |
| 2009/0254842 A1* | 10/2009 | Leacock | ............ | G06F 3/04815 |
| | | | | 715/757 |
| 2009/0307003 A1* | 12/2009 | Benyamin | ............ | G06Q 50/01 |
| | | | | 705/319 |
| 2011/0258049 A1* | 10/2011 | Ramer | ............... | G06Q 30/0273 |
| | | | | 705/14.66 |
| 2011/0302509 A1* | 12/2011 | Leacock | ............... | H04L 51/043 |
| | | | | 715/756 |
| 2012/0246582 A1* | 9/2012 | Leacock | ............... | G06Q 10/10 |
| | | | | 715/753 |

\* cited by examiner

FORUM SEARCH WITH TIME-DEPENDENT ACTIVITY WEIGHTING

CROSS-REFERENCE TO RELATED APPLICATION

This patent application is a continuation of U.S. application Ser. No. 15/292,048, filed Oct. 12, 2016, which is a continuation of U.S. application Ser. No. 14/680,008, filed Apr. 6, 2015, now U.S. Pat. No. 9,473,377, which is a continuation of U.S. application Ser. No. 12/479,171, filed Jun. 5, 2009, now U.S. Pat. No. 9,002,820, which claims priority pursuant to 35 U.S.C. § 119(e) to U.S. provisional application Ser. No. 61/059,210, filed Jun. 5, 2008, which applications are incorporated by reference herein.

BACKGROUND

1. Field

The present disclosure relates to methods and systems for locating information contained in disparate online forums.

2. Description of Related Art

Online forums are an increasingly popular tool for exchanging current news and opinions, and for social networking. As used herein, an "online forum" is a computer-implemented system or object that receives data input transmitted from multiple clients operated by individual users, aggregates the incoming data into a forum data object having an organized display format showing the input data optionally associated with an identifier for the contributing user, and posts or transmits the forum data object in response to newly received incoming data so that the forum data object is accessible to the multiple participating clients and is continually updated with new submissions. In the forum context, to "post" means to publish in the forum. Examples of online forums include computer bulletin boards, online chat rooms, and web blogs such as are implemented using Internet technology and IP-addressed forum data objects. Further examples include proprietary technology systems that utilize dedicated client software in combination with a network host to create a social networking environment as a form of on-line game, such as, for example, SECOND LIFE™, UTHERVERSE™, XBOX LIVE™ and others.

When selecting an online forum to participate in out of many possible forums of interest, users may employ a search engine to identify forums that match specified criteria. However, existing search engine technology cannot directly identify forums in which activity is currently highest, or in which activity is highest at particular times of day in a repeated pattern. Such activity information may be of interest to many users, for use in selecting forums to participate in, for use in scheduling activities to take place in forums, or both. However, present search engines do not capture or display activity information for use in comparing and selecting forums of interest. Such information is not readily apparent to existing search methods, despite its potential value. Technology to bridge this gap would be desirable.

SUMMARY

Time-dependent activity indicia for online forum activity may be collected using an indexing server in cooperation with one or more (typically many) servers hosting various online forums. The online forum hosts are configured to receive and publish time-stamped messages or other content from numerous clients. These contributions may be may be organized by message thread or topic. Characteristically for forums, the time of contribution is an important organizing parameter. In many online forums, the client-contributed content is organized primarily or exclusively chronologically in the forum publications. These publications, comprising web pages or similar objects, comprise the online forums or forum objects that are of interest to the end user. Activity in such forums may be defined in various different ways, but may generally be understood as a quantity of user-contributed content to the forum, per unit time. A time-dependent activity indicia refers to a measurement of activity that varies as a function of time.

The indexing server monitors activity in target forums. Target forums are selected using any suitable filter, for example average page views per day or frequency with which a forum is located using a topical search. The indexing server may use any of various methods, or a combination of such methods, to monitor and obtain relevant activity indicia for each forum. For example, the indexing server may analyze forum objects using a web crawler or similar technique, or receive activity reports from the forum host servers. The indexing server may categorize activity indicia into designated categories, for example, page views per unit time, submissions per unit time, words per unit time, and store in a database or other data structure in associate with an identifier for the each respective forum to which the activity indicia relates. The indexing server may also compute parameters such as running averages, cumulative totals, and cyclical maxima and minima for the activity data, which is also stored in the database.

The indexing server maintains the activity indicia database in a current state and provides the indicia in response to requests from search engines. The search engine may then use the activity to organize or filter search results. For example, the search engine may locate a list of forums relevant to a query search topic, request activity indicia for the listed forums from the indexing server, then rank the listed forums in order of current activity or other desired activity indicia. An end user will thereby be able to determine which forums have the greatest activity at designated times.

A more complete understanding of systems and methods for collecting and using time-dependent activity indicia of online forum activity will be afforded to those skilled in the art, as well as a realization of additional advantages and objects thereof, by a consideration of the following detailed description. Reference will be made to the appended sheets of drawings which will first be described briefly.

DETAILED DESCRIPTION

Figure 1:
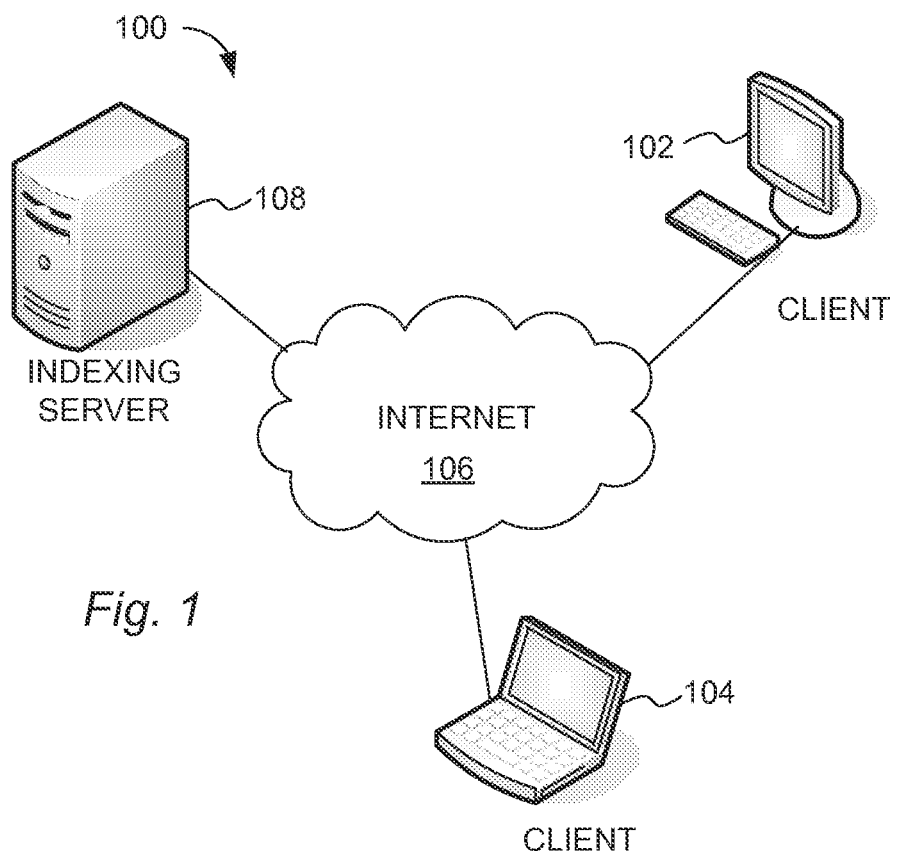
FIG. 1 is a system diagram showing an example of a networked computer system in which time-dependent activity indicia for use in forum selection may be implemented.

The present technology provides a computer-implemented method or system for providing time-dependent activity indicia for use in forum searching or selection, that overcomes the deficiencies of the prior art. The method or system may be implemented in a networked computing environment 100, as shown in FIG. 1. An exemplary networked environment may comprise, for example, a plurality of clients 102, 104 (two of many shown) in communication via wide area network components such as Internet 106 with at least one indexing server 108. Each client 102, 104 may comprise a processor, a input device, for example, a keyboard, pointing device, touchscreen, or microphone configured to receive input from a human user and to translate the input usable signals for the processor, and an output device, for example a display screen or speaker, to provide human-perceptible output in response to processor control. The indexing server 108 may operate one or more application to perform forum activity indexing and data output as described herein. The application may be encoded on a computer-readable media (not shown) operably associated with the server 108. Environment 100 may further include other servers, including but not limited to content servers, forum servers, and search engine servers (not shown), which may cooperate with the indexing server 108 to receive input from the client, develop indexing information, and output indexing information to clients 102, 104. Various arrangements and uses of such services will become apparent to one of ordinary skill in view of the present disclosure.

Figure 2:
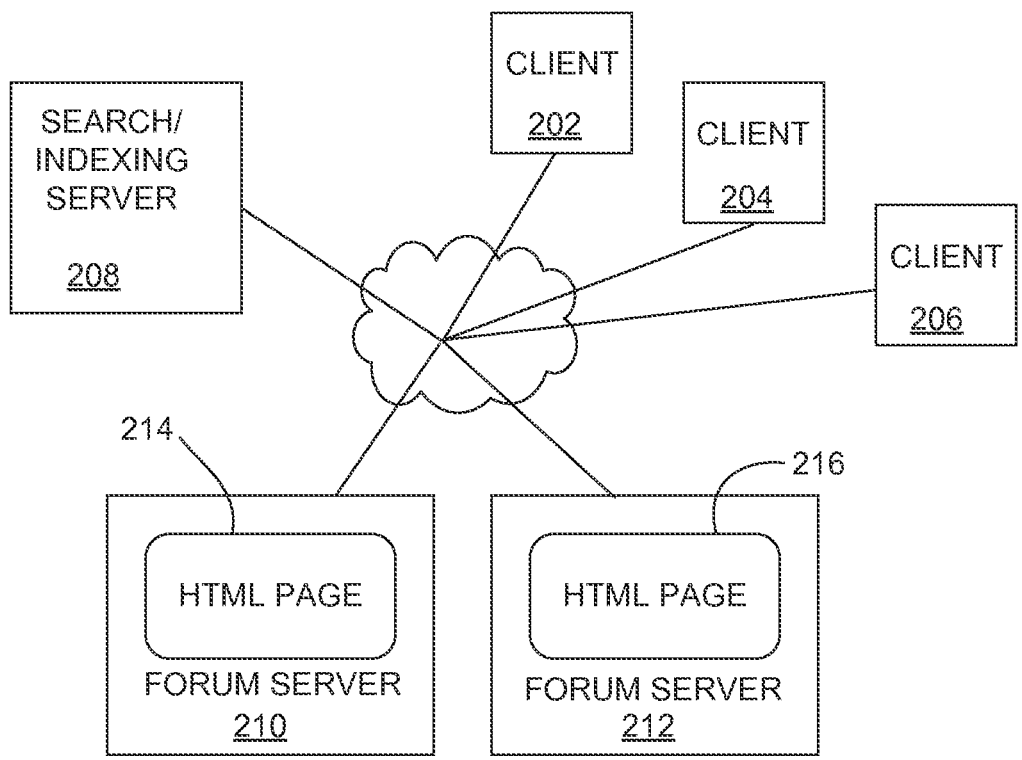
FIG. 2 is a block diagram illustrating an example of a system for time-dependent activity indicia for use in forum searching or selection.

FIG. 2 shows one exemplary arrangement 200 including a plurality of independent clients 202, 204, 206 communicating with a search/indexing server 208 and two independent forum servers 210, 212 via a wide area network 214. In the illustrated example, the search/indexing server is configured to perform forum searching and indexing, receiving search requests directly from clients 202, 204, 206, and providing activity indexing and search results directly to the clients. In an alternative embodiment, the indexing and searching functions may be distributed among two or more cooperating servers. For example, a search engine ("first") server may provide a search engine interface and handle search requests from the independent clients. An indexing ("second") server may perform activity indexing and provide activity indexing data to the first server in response to a data request. The first server may incorporate the index data in a search results list provided to a requesting client.

Forum servers 210, 212 (two of many shown) exemplify hosts for various independent Internet-compatible forums, for example, computer bulletin boards, web blogs, user comment pages, newsgroups, chat rooms, and so forth. Each host may receive participant contribution data from the remote clients 202. "Participant contribution data" as used herein refers to text, image, video, and/or audio data originating from a client participating in a online forum and designated for publication as a user posting/contribution in that forum. The forum host organizes the incoming participant contribution data according to the forum's organizing principles and publishes a forum web page 214, 216 or other object that provides access to the participant contribution data to forum members or participants. Optionally, the forum host filters, edits, or removes defective or objectionable participant contribution data before or after it is published in the forum. The forum page or other published object may be refreshed in response to participant contribution data as it is newly received by each respective forum server, at periodic intervals, in response to requests for the forum data, or any combination of the foregoing. In the alternative, the participant contribution data may be placed in a forum database as it is received and processed by the forum server, where it becomes available via a database interface page. Other suitable methods of hosting an online forum may also be known. Whatever method is used, the hosted forum objects (for example, forum pages 214, 216) have the characteristic of continuously changing in response to the addition of new participant contribution data. The more active the forum, the more quickly the forum object may change.

Rapidly changing data objects present a challenge to traditional search engines in that frequent refreshing of the search index is required to maintain search accuracy. This may be dealt with in various ways, such as by identifying data objects that change frequent as candidates for being considered forum objects, and scheduling known forum objects for more frequent indexing. Such solutions, however, are merely ancillary to the objectives and methods of the present disclosure. A different problem is faced by a user that seeks to optimize a forum selection process, or the timing of a forum event. One such problem is to identify, out of any given set of forums, which forums have the greatest relative activity. Another such problem is to determine, again for any given selection of forums, what relative level of activity may be expected in each forum at a particular time, or when a desired relative level of activity is most likely to occur. For example, a prospective forum participant may desire to select, out of a group of forums identified with the topic of "U.S. National Politics," that forum or forums with the highest current level of activity. For further example, a forum participant may desire to know what time of day a certain designated forum has historically experienced the greatest average level of activity.

Forum "activity" as used herein should be distinguished from inherent external characteristics of the forum data object, such as the most recent refresh time or a number of refreshes in a particular time period. Activity does not refer to such characteristics that are mere consequences of forum management by a forum host. Instead, forum activity refers to any one or combination of the following factors (a) the number of clients (or of clients having designated characteristics) requesting access to or viewing the forum object at a particular instant of time or within a designated limited time period (for example, the most recent second, minute, hour, day, etc.); (b) the rate at which participant contribution data (however measured) is being received for posting or is posted in a forum, again within any useful designated time period, for example, new posts per minute or words per minute; (c) a rate of change of (a) or (b); or (d) a quality of data received per unit time, for example, the number of 5-star rated postings received in the last 24 hours, wherein star ratings are published by the forum in response to user feedback.

As defined above, activity constitutes a machine-measurable state directly associated with the computer-implemented forum object, attributable to data submissions from participating clients. Generally, forum activity may be most easily measured directly at each forum host, for example at hosts 210, 212, although the technology is not limited to this.

Each forum host may execute, as part of its hosting process, an application or object that measures and records forum activity on a time-indexed basis. In the alternative, or in addition, the forum page or other object may be periodically processed by an application that is external to the forum host to measure forum activity that is discernable from information published in the forum object. It should be appreciated that "forum object" may include multiple linked Web pages or similar linked network objects that as a group make up a discrete forum.

Search/indexing server 208 may therefore receive forum activity data from various forum servers or hosts by any suitable method. For example, server 208 may maintain a database that is updated in response to receiving periodic data updates from remote forum hosts, according to a predetermined data sharing arrangement. In the alternative, or in addition, the server 208 may query one or more particular forum hosts for an update of forum activity data at periodic intervals, or in response to a search request from a system client. In yet another alternative or addition, the server 208 may access the forum data object (for example, pages 214, 216) and measure the forum activity such as can be discerned from the object itself. Some types of activity, for example the number of clients requesting access to the object, may not be discernable from inspection of the published forum object. Other activity, for example the number of postings in a defined time period, may be discernable from such inspection.

The search indexing server 208 may process activity data to develop one or more numerical indicators of forum activity level. The server 208 may store the indicators in a database or data table in association with an identifier for each forum and each time, or time period, to which the indicators pertain. In the alternative, or in addition, server 208 may calculate relevant activity indicators on the fly, in response to a data request. Server 208 may provide requested activity indicators in response to requirements from an internal search query or remote client request. For example, server 208 may receive a query from client 202, requesting "top five most currently active forums concerning baseball." In response, server 208 may first perform a search to identify all forums concerning baseball. Then, the server may query an activity index database to determine a most current activity indicator for each baseball forum. The server may then rank all the baseball forums in order of the returned activity indicator, and return a list of the top five most active baseball forums, rank ordered by activity indicator, to the requesting client 202.

Figure 3:
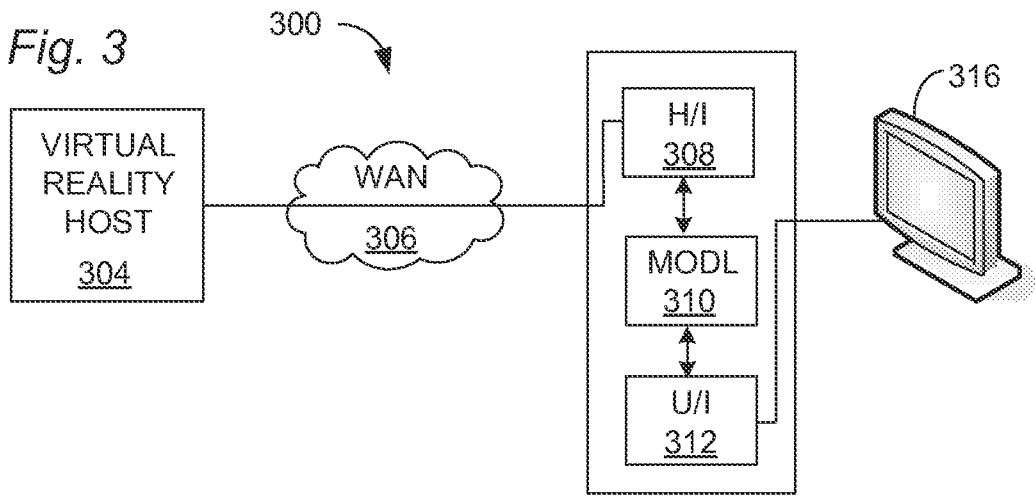
FIG. 3 is a block diagram showing an alternative system for providing multiple forums to a plurality of clients via a proprietary interface.

FIG. 3 shows an alternative system 300 for providing multiple forums to a plurality of clients 302 (one of many shown) via a proprietary interface, for example, in a massively multi-user online virtual reality system for social networking or gaming. System 300 may also include a virtual reality host 304 which may communicate with the plurality of clients via a wide area network 306. Host 304 may provide state data regarding a multiuser (i.e., process in which multiple clients participate simultaneously) to each participating client, for example client 302. Each client may cooperatively operate a host interface process 308, a modeling process 310, and a user interface process 312 within a virtual reality client application 314. The client application 314 may receive user input data and provide it to the host process 304. The host 304 aggregates multiple client input data, which may include participant contribution data for any forums hosted as part of, or associated with, the virtual reality process, to continuously provide state data for a modeled virtual reality process and associated forums. The host may provide the state data to the client VR process 314, which provides an output of the modeled environment as it changes through time and forum data, for example providing a visual display on monitor 316.

Figure 4:
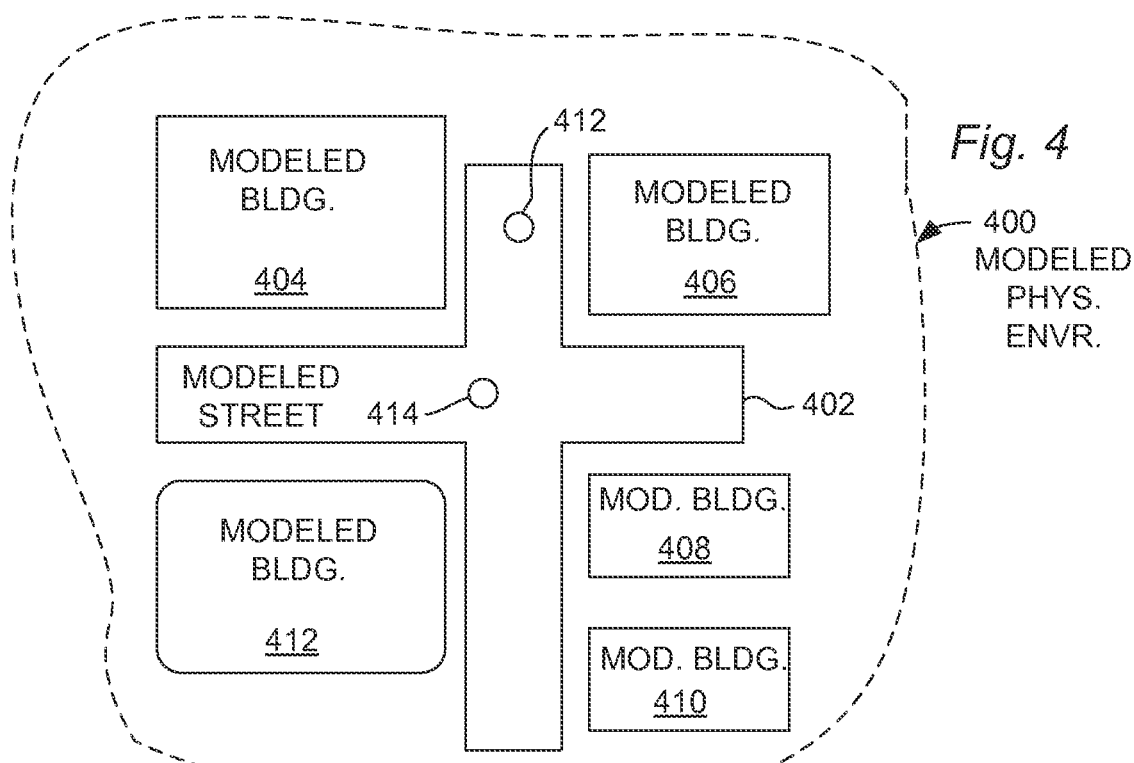
FIG. 4 is a schematic diagram showing a partial modeled physical environment such as may be used in a virtual reality online forum.

The virtual reality host may model a virtual physical environment through which each client may navigate via an associated avatar. FIG. 4 shows a schematic diagram of a partial modeled physical environment 400, in plan view. The exemplary model includes a modeled city street 402, along which are placed various modeled building 404, 406, 408, 410 and 412. Any number of avatars, for example avatars 412, 414, may be modeled in response to client input or system input within the modeled environment 400. One of the functions of the virtual reality environment is to provide an intuitive and visually stimulating navigational interface for all sorts of online activities, including participation in various forums. For example, environment 400 may include a first building 408 given the appearance of a singles' bar and intended to attract clients interested in a forum for meeting like-minded singles. To participate in the singles forum, the client may move a client-controlled avatar inside the "singles bar" 408. Once "inside" the bar 408, the client may automatically participate in a chat session with other clients that also have avatars within the "bar" or be given an option to do so. Other modeled buildings may provide access of different sorts of forums.

Despite a different user interface and architecture, the virtual reality environment 400 may host essentially the same types of forums as are executed in World Wide Web environments. One difference is that, currently, no uniform standard exists for hosting virtual reality processes. Therefore, all VR activity, including forum activity, is generally controlled through a unified proprietary host process. As such, searching for forums, indexing forum activity, and reporting on forum activity as described for World Wide Web processes may occur as part of the host process, instead of via cooperation between external host, search, and indexing servers. However, user of a VR process does not preclude external forum hosting or searching, as computing bridges may be built to link a proprietary VR process with external forum processes, search engines, or other services. FIGS. 3 and 4 are merely intended to illustrate how the inventive concepts herein may be applied in contexts other than the World Wide Web.

For example, within a virtual reality process with a large number of subscribing clients it is not unthinkable that dozens or even hundreds of alternative forums may be available at any given time. Navigating to numerous ones of these forums to find one in which suitable activity is occurring, and at which times, may be tedious for subscribing clients. Therefore, a VR host may offer a forum search function by which a client may search available forums to quickly locate one of more forums in which the desired level of activity is occurring, or reporting on one or more activity measures over daily/weekly/monthly or other periods. The client may then navigate an avatar to one of those forums to participate in the forum activities, or discern activity patterns in the various forums.

Figure 5:
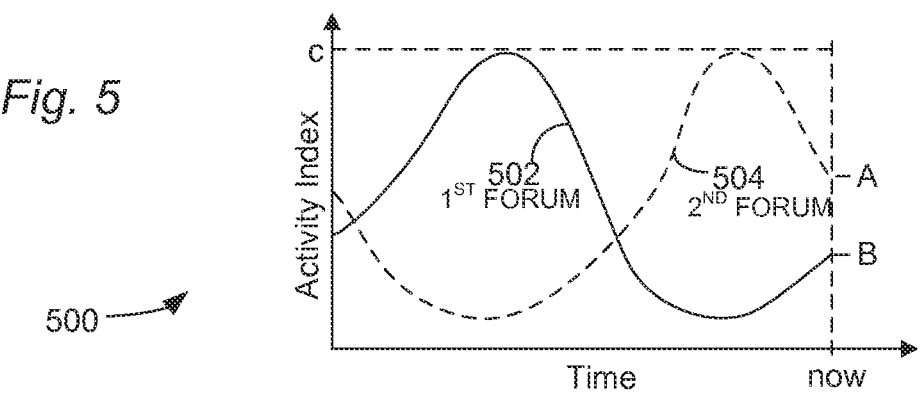
FIG. 5 is a chart showing cyclical patterns in online activity as may be measured for online forums.

In general, an indexing host, whether for general or proprietary forums, may determine and record an activity index over time, resulting in index data that may be plotted against time to reveal periodic activity patterns. For example, FIG. 5 shows an exemplary comparative plot 500 comparing the activity of two different forums over time. The highest current level of activity 'A' in a first forum is evident from the dashed indicator line 502 for the first forum, although activity is declining. A lower level of activity 'B' in a second forum is evident from the solid indicator line 504, although activity is increasing. Both the first and second forums have approximately the same peak level 'C' in the chosen activity index over the past reporting period. The sinusoidal pattern of the indicator lines may indicate, for example, a diurnal variation caused by differences in the geographic location of forum participants. Such patterns may be of interest, for example, to persons looking for a forum with a particular geographic predominance in the participants, or for other reasons.

Figure 6:
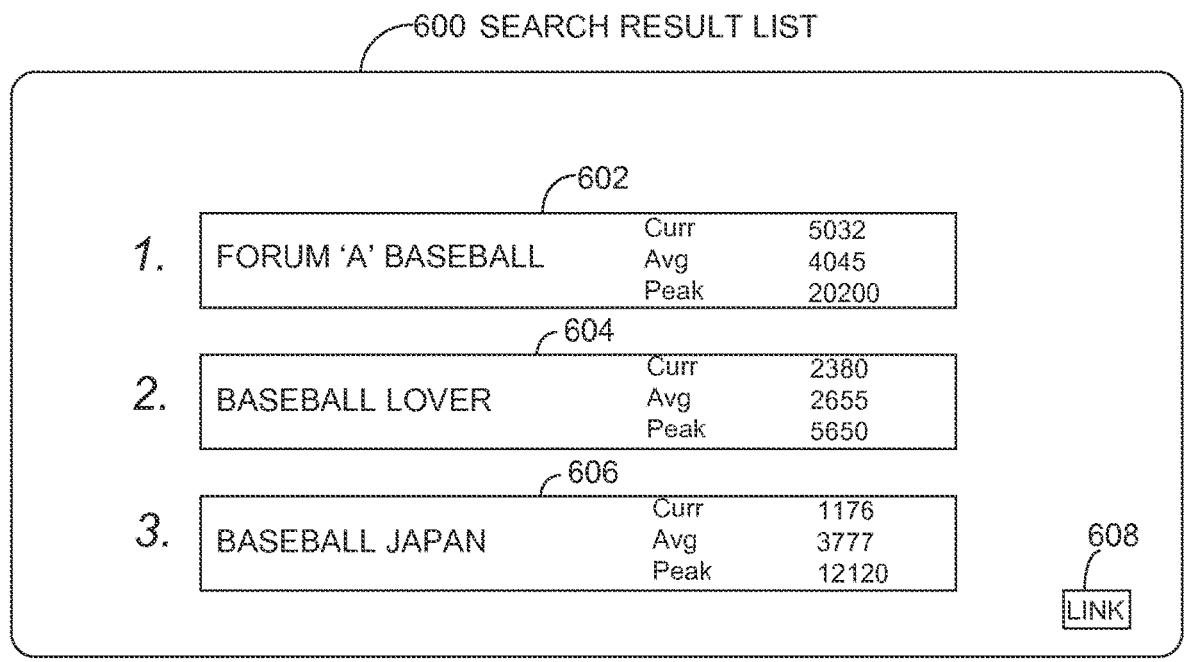
FIG. 6 is a simplified screenshot showing an example such as may be used to present forum search results ranked by order of forum activity measures.

FIG. 6 shows an exemplary search result list 600 such as may be returned by a search/indexing process in response to a client query, and output on a client display. Each item 602, 604, 606 on the list may comprise an entry for a forum concerning a topic specified by the query, for example "baseball." Each entry may comprise a description of the forum and/or a hyperlink to it, or other address. To the right of the description, several numeric activity indicators are listed for each entry, in this example, a most current activity level relative to the time the query was received, an average level over the past reporting period (for example, past day, week, or month), and a peak level over the past reporting period. Numeric indicator values may, in the alternative or in addition, be displayed List 600 may further include a link 608 to a chart showing a comparative activity indicator over time, as shown in FIG. 5.

Figure 7:
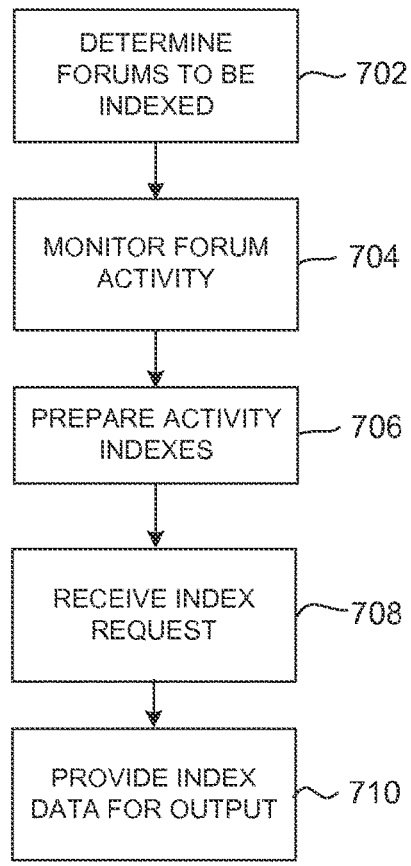
FIG. 7 is a flowchart showing an example of a method for providing time-dependent activity indicia for use in forum searching or selection.

FIG. 7 is a diagram showing exemplary steps of a method 700 such as may be performed by an indexing host application or server to provide time-dependent activity indicia for use in forum searching or selection. Instructions for performing the illustrated steps may be encoded in a computer-readable media for causing a host computer to perform the method, using methods as known in the art.

At 702, the host may determine which forums are to be indexed, that is, identifying the forums for which at least one activity index will be measured and tracked. In an embodiment, the host may identify all known forums, wherein known forums are identified by the host using a web crawler or other software that scans the Internet to discover published forum objects. In the alternative, or in addition, the host may identify forums that are located in response to user search queries. This approach may be appropriate where the indexing host provides activity index data to an external search engine operating a client interface. It has the advantage of limiting the forums that are indexed to forums that are actually found in response to user queries, therefore preventing wasting indexing resources on forum in which there is no apparent user interest. Conversely, because new forums of interest cannot be predicted, the host will not possess historical activity index data for forums that are requested for the first time. The host may cease indexing forums some time after (for example, weeks, months, or years) the last apparent user interest in the forum. Another approach is to limit indexed forums to those hosted by the indexing host, or by one or more specific forum hosts cooperatively associated with the indexing host. This approach may be suitable for indexing proprietary forums such as operated via multiuser online virtual reality hosts. Yet another approach is to develop activity indexes in response to specific user requests. For example, forum operators or users may register a particular forum for indexing by the host. In general, the set of indexed forums should not be static and should change over time to reflect forums having a pattern of recent activity or interest. Such forums may be identified in a list or database maintained by the indexing host.

At periodic intervals, the host may monitor forum activity 704 in the identified forums. As previously described, activity may be tracked by the forum host and reported to the indexing host. For example, a monitoring application may be distributed from the indexing host and operate on participating forums to monitor and report activity data to the indexing host. In the alternative, or in addition, the indexing host may operating web crawling software or other means for scanning published forum data to measure levels of current and past activity. For example, many forums publish member statistics and current forum viewing statistics on the forum pages. Web crawling software may be used to collect these statistics for use in activity indexing. For further example, the web crawling software may analyze forum objects to quantify past activity by a number of posted messages and time of posting of each message on the forum.

The indexing host may continually collect activity measurements and prepare activity indexes 706 from the provided data. As previously described, activity indexes are numerical indicators of (a) the number of clients (or of clients having designated characteristics) requesting access to or viewing the forum object at a particular instant of time or within a designated limited time period (for example, the most recent second, minute, hour, day, etc.); (b) the rate at which participant contribution data (however measured) is being received for posting or is posted in a forum, again within any useful designated time period, for example, new posts per minute or words per minute; (c) a rate of change of (a) or (b); or (d) a quality of data received per unit time. For example, the number of current viewers may be measured in five-minute intervals, and this number stored to provide a historical pattern of activity, including derivative indicators such as moving averages or the like.

At 708, the indexing host may receive requests for indexing data. These may occur, for example, as part of a search engine process that identifies forums in response to user queries. For example, a search engine may request specified index data for all results appearing on a search results list. In general, the indexing host may operate as a general data service configured to provide various different indexing data responsive to internal or external data requests.

At 710, the indexing host may retrieve and/or generate the requested indexing data in response to an incoming data request, configured for eventual output on the requesting client, for example in a screen as shown in FIG. 6. The responsive indexing data may be output in a format for display directly by the indexing host, or formatted by an intermediary client such a search engine host before transmission to the end user client. The search engine may use the reported activity indices for each forum to prioritize or filter search reports reported to a search engine client.

Method 700 merely exemplifies a method for providing time-dependent activity indicia for use in forum searching or selection. The present technology is not limited by this example.

Having thus described a preferred embodiment of forum searching using time-dependent activity weighting, it should be apparent to those skilled in the art that certain advantages of the within system have been achieved. It should also be appreciated that various modifications, adaptations, and alternative embodiments thereof may be made without departing from the scope and spirit of the present technology. The following claims define the scope of what is claimed.

What is claimed is:

1. A system comprising:
a first server comprising a computer processor and memory, the first server receiving search requests and returning search results;
a second server comprising a computer processor and memory, the second server serving a virtual reality process to a plurality of clients;
the second server modeling a virtual physical environment through which at least one client of the plurality of clients navigates via an associated avatar;
the virtual reality process including a plurality of identified locations;
at least one of the first server and the second server measuring a level of recent activity within at least two of the plurality of identified locations, where the level of recent activity includes a measurement of a number of interactions that users have attempted to make at the at least two of the plurality of identified locations, without regard to whether the interactions were accepted or displayed;
where the level of recent activity for the at least two of the plurality of identified locations is made available to the first server; and
the first server utilizing a search algorithm to generate search results, where the search results include search results related to at least one identified location having a higher level of recent activity and search results related to at least one identified location having a lower level of recent activity, where the search results related to the at least one identified location having the higher level of recent activity are given a different weight than the search results related to the at least one identified location having the lower level of recent activity.

2. The system of claim 1, where the first server measures the level of recent activity within the at least two of the plurality of identified locations.

3. The system of claim 1, where the second server measures the level of recent activity within the at least two of the plurality of identified locations.

4. The system of claim 1, where the first and second servers are the same server.

5. The system of claim 1, where the different weight given to the search results is a higher weight for the at least one identified location having the higher level of recent activity.

6. The system of claim 1, where the level of recent activity measured is text message exchange.

7. The system of claim 1, where the level of recent activity measured is image posting.

8. The system of claim 1, where the level of recent activity measured is video data.

9. The system of claim 1, where the level of recent activity measured is audio data.

10. A system comprising:
a server comprising a computer processor and memory, the server configured for serving a forum to a plurality of clients and serving at least one of the plurality of clients with search results;
the server modeling a virtual physical environment through which at least one client of the plurality of clients navigates via an associated avatar;
the forum including a plurality of identified locations;
the server measuring a level of recent activity within at least two of the plurality of identified locations, where the level of recent activity is measured by at least incorporating measurement of a number of posts that users have attempted to make to the forum, without regard to whether the posts were accepted by the forum;
the server utilizing a search algorithm to generate search results, where the search results include search results related to at least one identified location having a higher level of recent activity and search results related to at least one identified location having a lower level of recent activity, where the search results related to the at least one identified location having the higher level of recent activity are given a different weight than the search results related to the at least one identified location having the lower level of recent activity.

11. The system of claim 10, where the level of recent activity measured is text message exchange.

12. The system of claim 10, where the level of recent activity measured is image posting.

13. The system of claim 10, where the level of recent activity measured is video data.

14. The system of claim 10, where the level of recent activity measured is audio data.

15. A system comprising:
a server comprising a computer processor and memory, the server configured for receiving and responding to search requests;
the server receiving data regarding a recent activity level within a plurality of locations within a forum, the recent activity level including at least a primary measurement criteria of a number of posts that users have attempted to make to the forum, without regard to whether the posts were accepted by the forum;
the server utilizing a search algorithm to generate search results, where the search results include search results related to at least one location having a higher recent activity level and search results related to at least one location having a lower recent activity level, where the search results related to the at least one location having the higher recent activity level are given a different weight than the search results related to the at least one location having the lower recent activity level and to other locations without activity information.

16. The system of claim 15, where the recent activity level is a primary measurement criteria.

17. The system of claim 15, where the different weight given to the search results is a higher weight when the recent activity level is higher.

18. The system of claim 15, where the different weight given to the search results is a higher weight when the recent activity level is lower.

19. The system of claim 15, where the number of posts not accepted is a primary measurement criteria.

* * * * *